(12) United States Patent
Hillel et al.

(10) Patent No.: US 9,797,314 B2
(45) Date of Patent: Oct. 24, 2017

(54) METHOD AND APPARATUS FOR CONTROLLING A COMPRESSOR OF A GAS TURBINE ENGINE

(71) Applicant: ROLLS-ROYCE PLC, London (GB)

(72) Inventors: Malcolm Hillel, Derby (GB); Thierry Moes, Derby (GB); Rory Douglas Stieger, Derby (GB)

(73) Assignee: ROLLS-ROYCE plc, London (GB)

( * ) Notice: Subject to any disclaimer, the term of this patent is extended or adjusted under 35 U.S.C. 154(b) by 298 days.

(21) Appl. No.: 14/708,716

(22) Filed: May 11, 2015

(65) Prior Publication Data

US 2015/0354464 A1 Dec. 10, 2015

(30) Foreign Application Priority Data

Jun. 9, 2014 (GB) .................................. 1410180.2

(51) Int. Cl.
| | |
|---|---|
| F01D 17/00 | (2006.01) |
| F02C 9/18 | (2006.01) |
| F02C 3/04 | (2006.01) |
| F01D 15/10 | (2006.01) |
| F04D 27/02 | (2006.01) |
| B64D 13/06 | (2006.01) |
| F04D 19/02 | (2006.01) |

(52) U.S. Cl.
CPC ............... *F02C 9/18* (2013.01); *F01D 15/10* (2013.01); *F02C 3/04* (2013.01); *F04D 27/0223* (2013.01); *F04D 27/0261* (2013.01); *B64D 2013/0618* (2013.01); *B64D 2013/0644* (2013.01); *F04D 19/02* (2013.01); *F05D 2220/76* (2013.01); *F05D 2270/101* (2013.01); *Y02T 50/56* (2013.01)

(58) Field of Classification Search
CPC . F02C 9/18; F01D 15/10; F01D 17/00; F05D 2270/101; F05D 2270/1024; F05D 2270/3061; F05D 2220/76; F04D 27/0207; B64D 2013/0644
See application file for complete search history.

(56) References Cited

U.S. PATENT DOCUMENTS

| | | | |
|---|---|---|---|
| 4,380,893 A | 4/1983 | Stokes et al. | |
| 5,222,356 A | 6/1993 | Evenson et al. | |
| 5,235,801 A | 8/1993 | Evenson et al. | |
| 5,385,012 A * | 1/1995 | Rowe | ........................ F02C 9/18 60/779 |

(Continued)

FOREIGN PATENT DOCUMENTS

| | | |
|---|---|---|
| EP | 0059061 A2 | 9/1982 |
| EP | 2 591 999 A2 | 5/2013 |
| GB | 1244892 A | 9/1971 |

OTHER PUBLICATIONS

Nov. 10, 2015 Extended Search Rpeort issued in European Patent Application No. 15167058.5.

(Continued)

*Primary Examiner* — Ninh H Nguyen
(74) *Attorney, Agent, or Firm* — Oliff PLC

(57) ABSTRACT

A method of operating a gas turbine engine compressor. The method includes: determining an operating point of the compressor, and modulating mass flow of environmental control system input air to maintain the operating point of the gas turbine engine compressor within predetermined limits.

19 Claims, 4 Drawing Sheets

(56) References Cited

U.S. PATENT DOCUMENTS

| | | | | |
|---|---|---|---|---|
| 6,141,951 | A | 11/2000 | Krukoski et al. | |
| 6,216,981 | B1 * | 4/2001 | Helm | B64D 13/06 |
| | | | | 244/118.5 |
| 6,481,210 | B1 * | 11/2002 | Chapman | F02C 9/18 |
| | | | | 60/772 |
| 7,811,050 | B2 * | 10/2010 | Roth | F01D 17/162 |
| | | | | 415/116 |
| 8,967,528 | B2 * | 3/2015 | Mackin | F02C 6/08 |
| | | | | 244/134 R |
| 9,399,995 | B2 * | 7/2016 | Park | F04D 15/0005 |
| 9,482,236 | B2 * | 11/2016 | Khalid | F02C 9/18 |
| 2002/0170295 | A1 | 11/2002 | Chapman | |
| 2009/0326737 | A1 | 12/2009 | Derouineau et al. | |
| 2012/0216545 | A1 | 8/2012 | Sennoun et al. | |
| 2013/0061611 | A1 | 3/2013 | Dittmar et al. | |

OTHER PUBLICATIONS

Jan. 15, 2015 Search Report issued in British Application No. GB1410180.2.

* cited by examiner

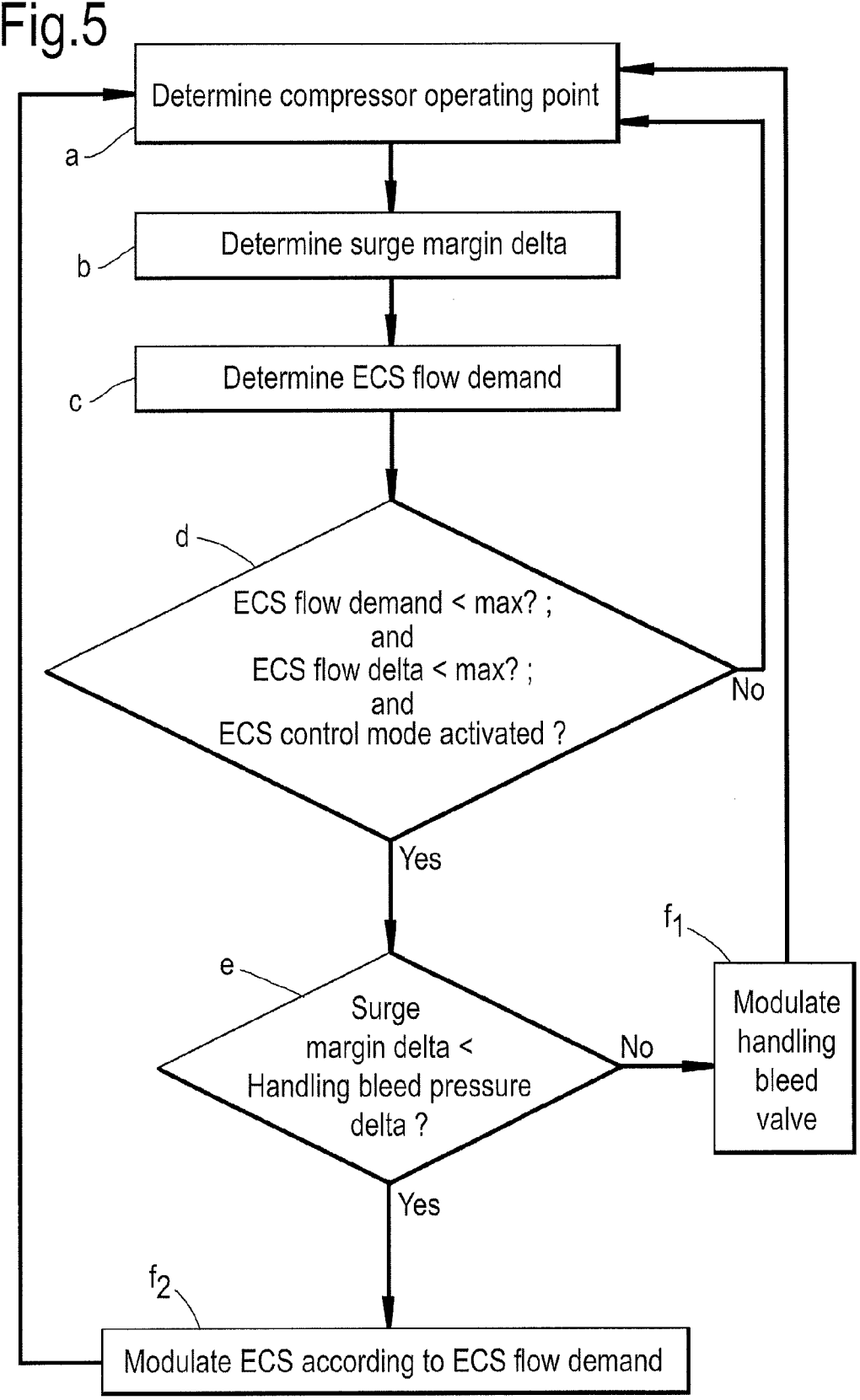

METHOD AND APPARATUS FOR CONTROLLING A COMPRESSOR OF A GAS TURBINE ENGINE

The present invention relates to a method of operating a compressor of an aircraft gas turbine engine, and a gas turbine engine compressor control system.

Aircraft are often powered by gas turbine engines having axial flow compressors. An axial flow compressor of an aircraft gas turbine engine typically comprises one or more rotor assemblies that carry blades of aerofoil cross-section. The compressor also comprises stator vanes, also of aerofoil cross-section, which are axially aligned behind the rotor blades. Each rotor and downstream stator row form a stage.

The compressor rotor is driven by the turbine, via a connecting shaft. It is rotated at high speed by the turbine causing air to be continuously induced into the compressor. The pressure rise results from the energy that is imparted to the air by the rotor. The air is then passed through the downstream stator, where swirl is removed and a rise in static pressure achieved.

As the air passes through each stage, the air pressure and temperature increase progressively. The last stator in the core or bypass stream removes substantially all the circumferential velocity, or swirl, from the air. The core air passes into the combustor pre-diffuser, before entering the combustion system.

For core compressors, the ratio of total pressure across each stage is in the range 1:1 to 1:2. The reason for the small pressure increase through each stage is that the rate of deceleration, or diffusion, of the airflow through each of the blades and vanes must be limited to avoid losses due to flow separation and subsequent blade stall. Although the pressure ratio of each stage is relatively small, there is an overall increase in pressure across every stage. The ability to design multi-stage, axial compressors with controlled air velocities and attached flow minimises losses and results in high efficiency and low fuel consumption.

Each stage within a multi-stage compressor possesses its own aerodynamic performance and handling characteristics—known as stage characteristics—that are different from those of its neighbouring stages. Accurate matching of the stages is of crucial importance to achieving low losses and adequate operating range for off-design operation. The front stages tend to control the low speed surge margin; the rear stages, the high speed surge margin.

At higher operating speeds, if the operating conditions imposed upon the compressor force operation beyond the limits of the surge line, the rear stages will become overloaded, and an instantaneous breakdown of the airflow through the compressor occurs, leading to stall or surge in which the compressor experiences a loss in compressor pressure rise capability. The value of airflow and pressure ratio at which a surge occurs is termed the surge point. Due to the loss of pressure rise capability across the compressor stages, the high pressure air in the combustion system may be expelled forward through the compressor (negative flow direction) resulting in a loss of engine thrust. This "deep" surge produces a loud bang, and it is possible for combustion gas to come forward through the compressor inlet. Surge can also take a milder form, producing an audible "burble" and a small fluctuation in inlet mass flow rate.

Although the two terms "stall" and "surge" are often used synonymously, there is a difference which is mainly a matter of degree. A stall may affect only one stage, or even group of stages, but a compressor surge generally refers to a complete flow breakdown through the compressor.

Rotating stall, surge, and flutter cause blade vibration, and can induce rapid aerofoil failure and subsequent destruction of the compressor.

As the pressure ratio of a compressor is increased, it becomes more difficult it becomes to ensure that it will operate efficiently and in a stable manner over the full speed range. This is because the requirement for the ratio of inlet area to exit area at the high speed operating point results in an inlet area that becomes progressively larger relative to the exit area. As the compressor speed and hence pressure ratio is reduced, the axial velocity of the inlet air in the front stages becomes low relative to the blade speed. This increases the incidence of the air onto the blades to the point where aerodynamic stall occurs; lift is lost from the aerofoil and the compressor flow breaks down. Where high pressure ratios are required from a single compressor module, this problem can be overcome by introducing variable inlet guide and variable stator vanes to the front stages of the system. By closing these vanes at low speed, the incidence of air onto the front stage rotor blades is reduced to angles they can tolerate. The variable vane is of aerofoil cross-section with an integral spindle to allow rotation, or variation of stagger. The vane is mounted in bushes in the casing or inner shroud ring and has a lever fitted to its outer end. The variable vane levers are all connected to the unison ring via spherical bearings, so, when the unison ring is rotated, the vanes all re-stagger together.

Alternatively, it is possible to use handling bleed off-take to aid part-speed operation. The incorporation of handling bleeds (located between compressor stages, and/or after the highest pressure stage of a rotor module) removes a proportion of air from the compressor stage, and dumps the bled air into the bypass flow. While this method corrects the axial velocity through the preceding stages, energy is wasted through the work done to compress the air that is then not used for combustion. In some cases however, it is impractical to provide variable stators. For example, the high pressure (HP) compressor on a multi-spool engine typically does not include variable stators, and so bleeds must be provided for both transient and steady state operation at low power. Similarly, variable stators are typically only provided at lower pressure stages in intermediate pressure (IP) compressors on three-spool engines.

In a known bleed off-take arrangement, a predetermined number of bleed valves are commanded open according to a pre-set schedule which is based on compressor non-dimensional speed and other engine parameters. For example, handling bleeds may be opened when the engine is operated at or close to idle. Taking too much handling bleed is wasteful of turbine work and causes additional, unnecessary fuel burn.

Furthermore, handling bleed valves are generally either open or closed, and have no fractionally open modes of operation. This leads to unnecessary additional fuel burn. For example, two valves will need to be opened in order to achieve a bleed which is equivalent to the flow though only 1.5 open valves.

High flying aircraft powered by gas turbine engines often require pressurising and heat, ventilation and air conditioning (HVAC) for crew and passenger safety and comfort. Pressurisation and HVAC are provided by an environmental control system (ECS), which is provided with pressurised input air.

Two types of ECS are known in the art—so called "bleed systems" which provide pressurised input air bled from the main compressor of a gas turbine engine such as the main engines or APU of the aircraft, and "bleedless systems"

which provide pressurised input via a dedicated compressor, which may for example be driven electrically.

In either system, the amount of input air provided to the ECS is determined by a schedule on the basis of ECS requirements (such as cabin pressure, temperature and air quality considerations), and does not take into account engine operability requirements. A portion of this input air is then recycled within the ECS, again according to ECS requirements. However, this air must be supplied by the gas turbine engine (either directly through the bleed system, or indirectly via the dedicated compressor powered by the engine driven generator). Consequently, the ECS system can have an adverse or beneficial effect on engine operability, and the engine must therefore be operated in accordance with a "worst case" scenario which assumes an ECS input flow that would adversely affect engine operability to the greatest extent.

It is an object of the present invention to alleviate the problems of the prior art at least to some extent.

The invention is set out in the accompanying claims.

According to a first aspect of the invention, there is provided a method of operating a compressor of a gas turbine engine, the method comprising:

determining a current operating point of the compressor; and modulating mass flow of environmental control system input air to maintain the operating point of the gas turbine engine compressor within predetermined limits.

Advantageously, since the ECS input air can be varied more sensitively than engine bleed offtakes, smaller incremental movements of the operating point of the compressor can be achieved. Consequently, the compressor operating point can be maintained closer to the working line, thereby reducing specific fuel consumption. Since a working ECS is generally a requirement for operation of a civil aircraft (i.e. a non-functioning ECS will prevent an aircraft from being utilised), the provision of the above method can be used in place of one or more bleed valves, thereby reducing the weight and/or complexity of the engine.

The gas turbine engine may comprise a multi-spool gas turbine engine comprising first and second independently rotatable compressors coupled to respective first and second independently rotatable turbines by respective first and second shafts.

In a first example, the gas turbine engine comprises a three-spool engine comprising a high pressure compressor coupled to a high pressure turbine by a high pressure shaft, an intermediate pressure compressor coupled to an intermediate pressure turbine by an intermediate pressure shaft, and a fan coupled to a low pressure turbine by a low pressure shaft.

In a second example, the gas turbine engine comprises a two-spool engine comprising a high pressure compressor coupled to a high pressure turbine, a booster compressor coupled to a low pressure turbine, and a fan coupled to the low pressure turbine, the fan and booster compressor being coupled to the low pressure turbine by a low pressure shaft, and the high pressure compressor being coupled to the high pressure turbine by a high pressure shaft.

The environmental control system may comprise a "bleedless" system, in which input air is provided to the ECS via a dedicated ECS compressor. The ECS compressor may be powered by an electric motor, which may in turn be electrically powered by a gas turbine engine driven electrical generator.

In a first embodiment, the gas turbine engine generator that provides electrical power for the ECS compressor may be driven by a low pressure shaft of a two-spool gas turbine engine. In a second embodiment, the gas turbine engine generator that provides electrical power for the ECS compressor may be driven by an intermediate pressure shaft of a three-spool engine.

It has been found that, in bleedless systems, where the gas turbine engine generator that provides electrical power for the ECS compressor is driven by a low pressure shaft of a two-spool engine or an intermediate pressure shaft of a three spool gas turbine engine, a higher ECS input flow will result in a higher load on the ECS compressor, and therefore a higher load on the gas turbine engine electrical generator, which provides electrical power for the ECS compressor. In turn, this higher load on the electrical generator will cause a braking load on the gas turbine engine compressor that drives the electrical generator, which will move the operating point of that compressor away from the surge line. This may also have a beneficial effect on the surge margin of the downstream high pressure compressor.

Where the environmental control system comprises a bleedless system, the method may comprise reducing the environmental control system input mass flow when the current operating point of the compressor is determined to be less than a first predetermined margin of the compressor surge line, and increasing the environmental control system input mass flow when the current operating point of the compressor is determined to be greater than a second predetermined margin of the compressor surge line. The method may comprise operating the environmental control system input mass flow at a level above a predetermined minimum.

Advantageously, the compressor operating point can be more accurately and efficiently moderated by moderating the ECS input flow in a bleedless system, while reducing the requirement for handling bleeds.

Alternatively, the environmental control system may comprise a "bleed" system, in which input air is provided to the ECS from a bleed offtake of the compressor of the gas turbine engine. The bleed offtake may comprise an offtake valve configured to modulate offtake massflow.

Where the environmental control system comprises a bleed system, the method may comprise increasing the environmental control system input mass flow when the current operating point of the compressor is determined to be less than a first predetermined margin of the compressor surge line, and decreasing the environmental control system input mass flow when the current operating point of the compressor is determined to be greater than a second predetermined margin of the compressor surge line.

The method may comprise determining a combination of handling bleed valve positions and environmental control system input flows which maintains the operating point of the compressor at or above a minimum surge margin, or substantially matches the operating point of the compressor to the minimum surge margin.

The method may comprise determining the operating point by comparing one or more sensed gas turbine engine parameters to a lookup table. The sensed gas turbine engine parameters may comprise one or more of pressure ratio, fuel flow, core air temperature (such as compressor outlet and/or inlet temperature) and compressor mass airflow. Alternatively, the method may comprise determining the operating point by comparing engine rotational speed to a lookup table.

The method may comprise comparing a pressure difference between the determined current operating point and a surge line to determine a current surge margin. The method may comprise using a lookup table comprising a relationship between ECS input air mass flow and current surge margin to determine an ECS input air mass flow required to match the operating point of the gas turbine engine compressor to the minimum surge margin.

The method may comprise modulating a mass flow of environmental control system input air to maintain the operating point of the gas turbine engine compressor within predetermined limits only where
the determined ECS input air mass flow is less than a maximum ECS inlet air mass flow capacity.

The method may comprise modulating a mass flow of environmental control system input air to maintain the operating point of the gas turbine engine compressor within predetermined limits only where
a difference between the determined ECS input air mass flow and an ECS inlet air flow set point is less than a predetermined value.

The method may comprise modulating a mass flow of environmental control system input air to maintain the operating point of the gas turbine engine compressor within predetermined limits only where an ECS flow control mode is selected.

The method may comprise modulating a mass flow of environmental control system input air to maintain the operating point of the gas turbine engine compressor within predetermined limits only where the difference between the surge margin with the modulated ECS air flow and the minimum surge margin is less than the difference between the surge margin that would be provided by opening a handling bleed and the minimum surge margin.

The method may comprise opening a handling bleed valve if the difference between the surge margin with the modulated ECS air flow and the minimum surge margin is greater than the difference between the surge margin that would be provided by opening a handling bleed and the minimum surge margin.

Advantageously, the handling bleed valves providing the bulk of the bleed offtake, and the ECS input air mass flow provides the balance necessary to maintain the operating point close to within the predetermined margins.

The method may comprise modulating the proportion of ECS input air and recirculation air in the environmental control system. Advantageously, the overall air flow through the ECS can be maintained at a substantially constant level while modulating the amount of ECS input air taken by the ECS.

According to a second aspect of the present invention, there is provided a gas turbine engine compressor control system, the control system comprising:
a handling bleed valve system;
an environmental control system air input system; and
a controller configured to modulate mass flow of environmental control system input air in accordance with the method of the first aspect of the invention.

The handling bleed valve system may comprise at least one handling bleed valve configured to reduce the pressure in a compressor stage of the compressor. The handling bleed valve system may comprise a plurality of handling bleed valves for a single compressor stage, and may comprise a plurality of handling bleed valves for a plurality of compressor stages.

The environmental control system may comprise a plurality of environmental control system bleed offtakes for providing environmental control system input air. The environmental control system may comprise a plurality of environmental control system bleed offtakes, each of which being located at a different stage of the compressor.

The environmental control system may comprise one or more intake air modulation valves, and each environmental control system bleed offtake may comprise a modulation valve.

The environmental control system may comprise a cabin air recirculation valve configured to moderate the proportion of cabin air from the bleed offtakes to recirculated cabin air. The controller may be configured to modulate the cabin air recirculation valve.

Embodiments of the present invention will now be described by way of example, with reference to the accompanying figures in which:

FIG. 5 shows a logic diagram for controlling the environmental control system of FIG. 3 or FIG. 4.

Figure 1:
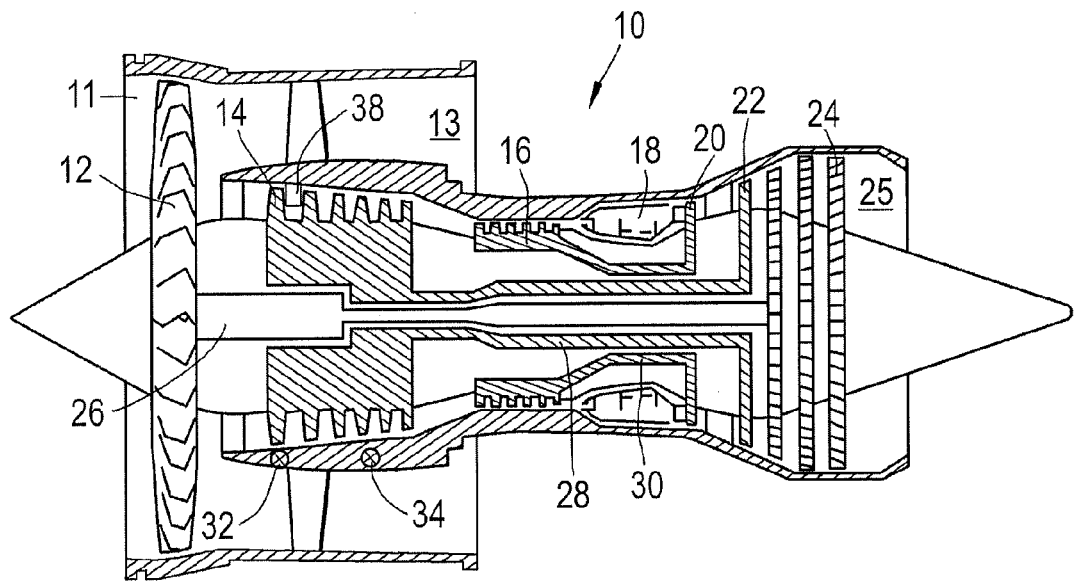
FIG. 1 shows a conventional high-bypass gas turbine engine.
Figure 2:
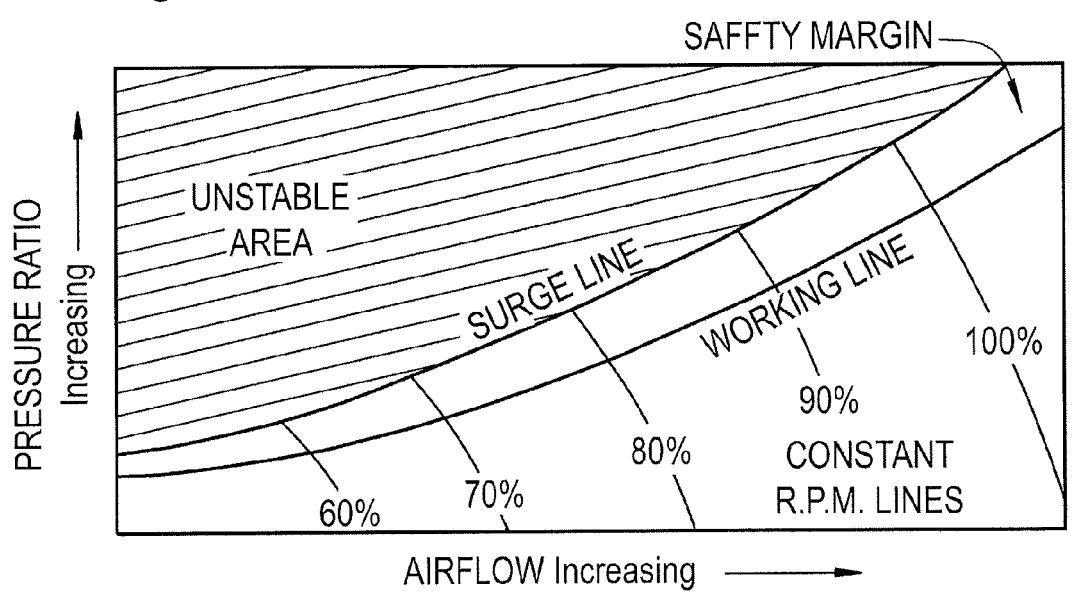
FIG. 2 shows a compressor map of the compressor of the engine of FIG. 1.

FIG. 1 shows a high-bypass gas turbine engine 10. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

Figure 4:
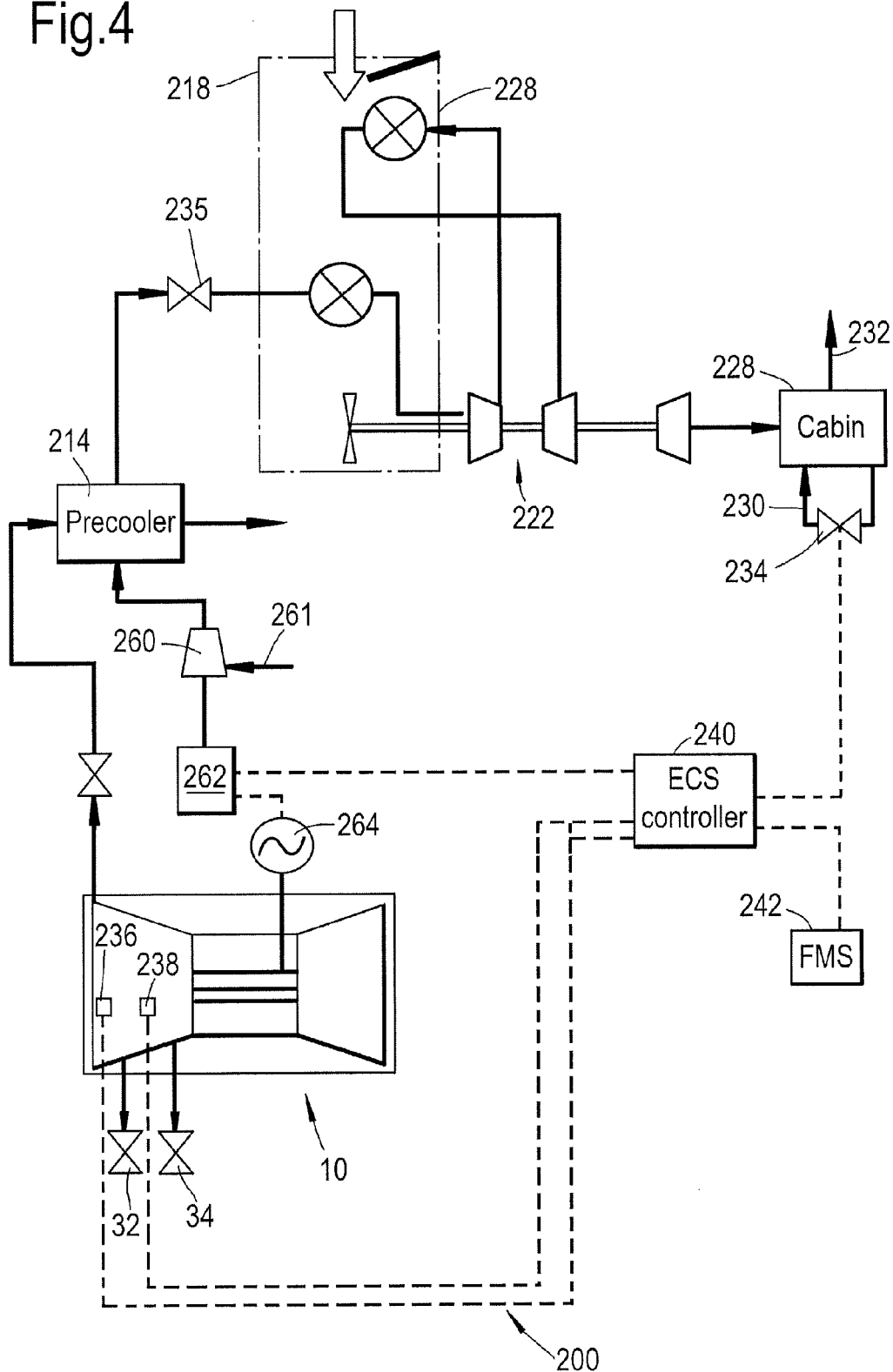
FIG. 4 shows a schematic drawing of a second environmental control system.

The compressors 14, 16 operate at different speeds and pressure ratios during operation. This can be visualized using a "compressor map", examples of which are shown in FIGS. 4 and 5. The compressor map is a graph showing compressor entry mass flow on the x-axis, with pressure ratio ($P_{exit}/P_{inlet}$) on the y-axis. As can be seen, the compressor map includes a working line, which represents the pressure typical steady state condition of the compressor, and a surge line, which represents a pressure beyond which the compressor 14, 16 will stall or surge for a given mass flow. The difference in pressure between the surge line and current operating point represents the surge margin.

The operating point can be controlled by opening and closing of handling bleed valves 32, 34. The handling bleed valves 32, 34 communicate with stages of the compressors 14, 16 between the inlet and outlet, to reduce the pressure ratio of the compressor. In this example, a first handling bleed valve is provided after the final compressor stage of the intermediate pressure compressor module (IP8) between the intermediate and high pressure compressors 14, 16. A second handling bleed 34 is provided between the third and fourth stages of the high pressure compressor 16 (i.e. at HP3). The operating point can be further varied by changing the angle of inlet guide vanes 38 located at the first, second and possibly third stages of the intermediate pressure compressor 14. The vanes 38 are operated in accordance with a schedule which operates independently of the operation of the handling bleeds and ECS inlet flow. Further inlet guide vanes (not shown) could also be provided in the high pressure compressor 16. In this case, the inlet guide vanes of the high pressure compressor 16 and the ECS inlet flow could be operated in combination in accordance with an optimiser, such that the lowest overall fuel burn is achieved.

Figure 3:
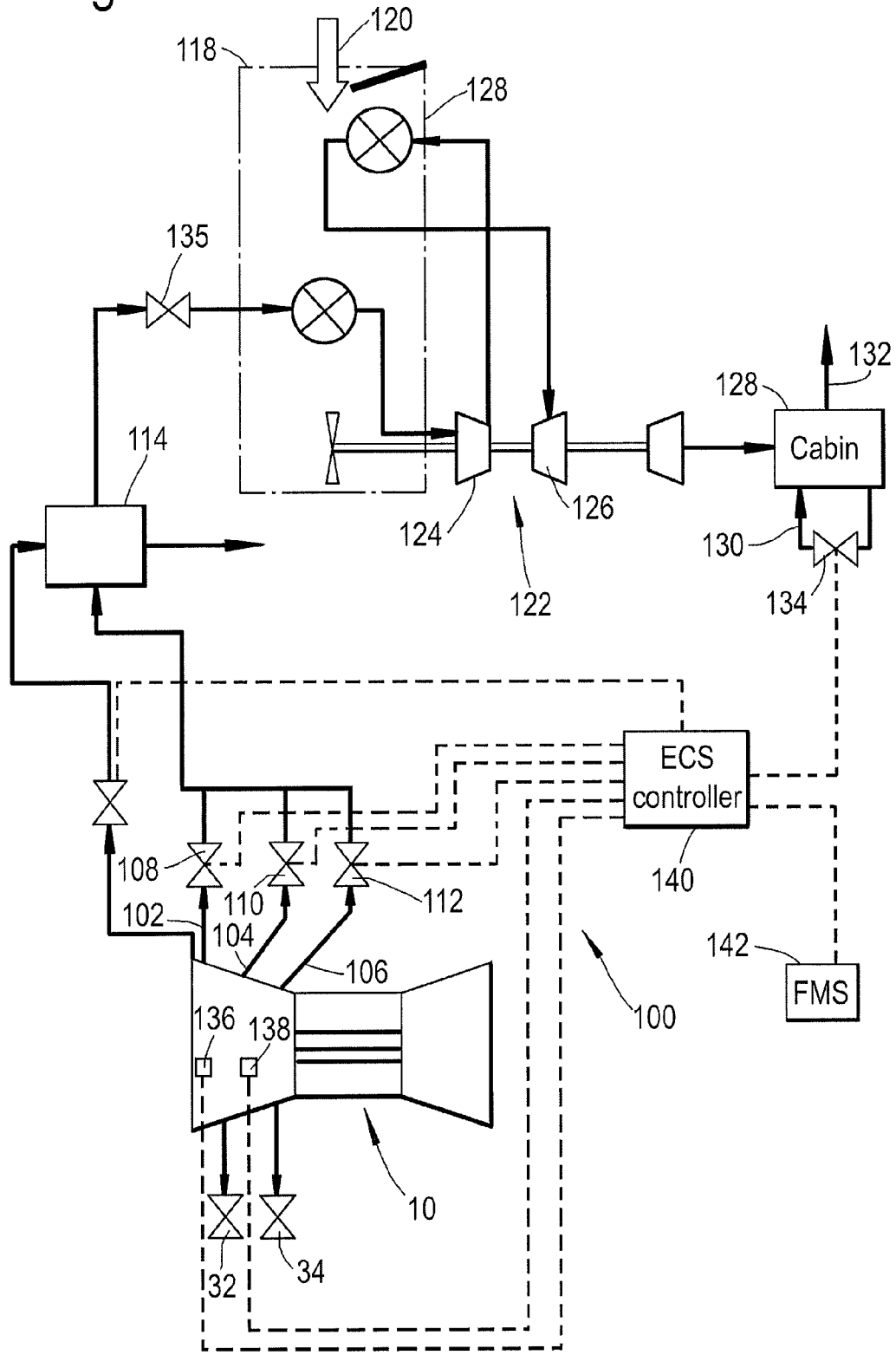
FIG. 3 shows a schematic drawing of a first environmental control system.

FIG. 3 shows a first environmental control system in the form of a bleed ECS 100. The system comprises a low pressure ECS bleed port 102, intermediate pressure bleed port 104, and a high pressure bleed port 106. Systems comprising greater or fewer bleed ports are also known. The bleed ports 102, 104, 106 supply inlet air to the remainder of the ECS 100. Respective valves 108, 110, 112 are provided, which determine which bleed ports inlet air to the ECS system 100. Bleed air from the ports 102, 104, 106 is first cooled in a pre-cooler heat exchanger 114, then cooled further to a lower temperature in a first ram air heat exchanger 118 by air from a ram air duct 120. The air is then transferred to an air cycle machine 122, which cools the air to a required temperature for delivery to the cabin 128. In some cases, several air cycle machines are provided in series. The air cycle machine 122 comprises a compressor 124 and a turbine 126. Located between the compressor 124 and turbine 126 is a second ram air heat exchanger 128. Air passes through the compressor 124 where it is compressed and thereby heated. The compressed air is then cooled to a lower temperature in the heat exchanger 128 by ram air, before being cooled to a still lower temperature by the turbine 126, which drives the compressor 124 via an interconnecting shaft. The cooled air is then passed to the cabin 128.

A flow control valve 135 is provided, which controls the total mass air flow of the inlet air which is provided to the ECS system 100. The valve 135 can be set to substantially any setting between 0% and 100% of maximum air flow. Alternatively, the mass flow of inlet air could be individually controlled by varying the position of the ECS bleed valves 108, 110, 112 which could be individually controlled to any setting between 0% and 100%, rather than being only settable to on/off positions.

The valves 108, 110, 112 are individually controlled in accordance with a schedule on the basis of altitude and engine pressure. Generally, the valves 108, 110, 112 are operated such that the valve or combination of valves in communication with the lowest pressure compressor stage which can provide adequate mass flow, pressure and temperature are opened to provide compressor inlet air, with the other valves being closed.

A recirculation loop 130 is provided, which recirculates some of the air within the cabin, before the air is exhausted through an exhaust 132. The proportion of inlet air and recirculation air that is provided to the cabin airflow is modulated by a recirculation valve 134.

Sensors are also provided, including one or more sensors for determining or modelling engine compressor operating point (for example a corrected rotational speed sensor 136 and compressor overall pressure ratio sensor 138), a sensor for determining cabin air flow requirements (such as cabin temperature and pressure sensors).

A controller (ECS controller) 140 is provided, which controls the ECS system 100 in accordance with a method described in relation to FIG. 5.

FIG. 4 shows an alternative ECS system 200. The system 200 comprises a "bleedless" ECS system, in which the ECS bleeds 102, 104, 106 and corresponding valves 108, 110, 112 are omitted. Instead, an ECS compressor 260 is provided, which provides high pressure air for the ECS system 200, drawn from the ambient air (for example from a ram air scoop 261).

The compressor 260 is driven by an electrical motor 262, which is in turn supplied with electrical power from an engine driven generator 264. The generator 264 is coupled to the intermediate pressure shaft 28. The engine driven generator applies a load to the shaft 28 that drives the generator 264, and so intermediate pressure compressor 14, in accordance with electrical demand from the ECS system 200. Further aircraft and engine electrical demands are provided by the generator 264 (such as avionics and cabin electrical power demands), but the compressor 260 represents a large proportion, or even the majority, or electrical power requirements in an aircraft having a bleedless ECS system 200. Though no bleed ports are provided for the ECS system 200, handling bleeds 32, 34 are still provided. The mass flow rate of the ECS inlet air can be modulated by, for example, varying the speed of electric motor 262, or by varying angles of variable inlet guide vanes of the ECS compressor 260.

The remainder of the system is similar to the bleed ECS system 100, comprising a pre-cooler 214, first and second ram air heat exchangers 218, 228, air cycle machine 222, flow control valve 236 and recirculation valve 234.

The valves 108, 110, 112, 134, 135 in this case of system 100, and valve are controlled by an engine bleed controller 140. The engine bleed controller 140 is in signal communication with the sensors 136, 138 and a flight management system (FMS) 142. The controller 140 controls the valves 108, 110, 112, 134, 136 in accordance with a process set out in FIG. 5.

As shown in FIG. 5, the engine 10 is operated in accordance with a first step a), when the engine 10 is operated at a steady state (i.e. without significant acceleration or deceleration). In this embodiment, where transient operation is detected (i.e. during acceleration or deceleration of the engine), the handling bleed valves 32, 34 are operated in accordance with a schedule that does not take into account ECS inlet mass flow. In the first step a), a compressor operating point of the main engine compressors 14, 16 is first determined. The compressor operating point is determined by the controller 140 from overall pressure ratio and airflow data from the sensors 136, 138. Alternatively, the compressor operating point could be inferred from a working line from the compressor map, on the basis of compressor rotational speed.

In a second step b), the current surge margin of the compressors 14, 16 is determined and compared to a minimum surge margin. This current surge margin is determined by comparing the operating point determined in step a) to a compressor map stored in a lookup table. The compressor map comprises a surge line, which represents a maximum pressure ratio that can be sustained for a given compressor mass airflow. The surge margin is then the difference in pressure ratio between the operating point and the surge line.

This surge margin is then compared to a minimum surge margin, which is represents an operating pressure ratio below which the compressor is regarded as being safely operable, without significant risk of surge. The pressure ratio difference between the surge margin and the minimum surge margin represents a surge delta.

In a third step c), an ECS flow demand is calculated. The ECS flow demand represents the ECS input air mass flow required to match the surge margin to the minimum surge margin (i.e. to minimize surge delta). The ECS flow demand is calculated by inputting the surge delta into a lookup table which contains a relationship between ECS input air mass flow and a corresponding compressor surge margin delta. From this comparison, the required ECS inlet air mass flow can be calculated to provide the required surge delta. This flow is hereinafter referred to as "ECS flow demand".

In the case where the ECS system comprises a bleed system such as the system 100, increasing ECS inlet air mass flow from a bleed port located after the final stage of a compressor 14, 16 will lower the operating point of the compressor 14, 16 by an amount proportional to the mass flow (since the bleed ports 102, 104, 106 are located at a point downstream from the compressor inlet). On the other hand, increasing ECS inlet air mass flow from an interstage bleed port located further from the compressor outlet will primarily raise the surge line. In either case, increasing the ECS inlet air mass flow will result in the compressor operating point moving away from the surge line, and decreasing the ECS inlet air mass flow will result in the compressor operating point moving toward from the surge line. In this case therefore, the lookup table relates bleed air port 102, 104, 106 flows and compressor pressure ratio drops. Separate lookup tables may be provided for the different ports 102, 104, 106, and the valves 108, 110, 112 may be controlled individually.

On the other hand, where the ECS system comprises a bleedless system such as the system 200, modulation of ECS input air mass flow will result in changing the load on the ECS compressor 260. This will in turn result in more electrical power demand on the electrical generator 264. The electrical power demand will act as a brake on the compressor 14, to which the electrical generator 264 is coupled. Consequently, where the ECS mass air flow is increased, such as by operating the ECS compressor 260 at a higher speed, the compressor 14, will operate at a slower speed, thereby increasing the surge margin where the compressor is operating within a particular speed range. Reducing ECS mass air flow will therefore reduce the surge margin when the intermediate pressure compressor 14 is operating within the particular speed range. Handling bleed 32, 34 use can therefore be reduced by increasing ECS inlet air flow in a bleedless ECS system. The particular speed range in which increased ECS inlet air mass flow increases surge margin is generally at relatively low compressor speeds, at or close to idle. The lookup table will generally therefore include different relationships between ECS inlet air mass flow and surge margin delta for different intermediate compressor 14 speeds.

A similar effect can be seen on a two-shaft engine, where the ECS compressor is driven by electrical power from a low pressure shaft driven electrical generator. In that case, increasing ECS inlet air mass flow will again improve surge margin at low compressor speeds.

In the bleedless system, two lookup tables may be used to determine the ECS flow demand. A first lookup table contains the relationship between electric power demand and the corresponding ECS inlet mass flow, i.e. how much electrical power is required to generate a given ECS inlet mass flow. A second lookup table correlates the relationship between electrical power demand and surge delta. From these lookup tables, an ECS flow demand which substantially matches the operating point to the surge margin can be determined.

In a fourth step d), three conditions are tested to determine how to proceed:
1. Is ECS delta flow less than ECS flow delta max?
2. Is ECS flow demand less than max flow demand?
3. Is ECS control mode activated?

ECS delta flow represents a difference between ECS flow demand and an ECS set point. The input air mass flow set point is an ECS input air mass flow which could be set by the pilot using the FMS 142, which is communicated to the controller 140. Alternatively, the air mass flow set point could be determined by the ECS controller 140 based on current parameters such as sensed altitude, a temperature setting (which could in turn be selected by the pilot using the FMS 142) and the number of passengers aboard (which could again be set by the pilot using the FMS 142). ECS flow delta max is therefore the maximum difference between the ECS flow demand and the ECS set point. This may be determined by cabin air quality, pressure and temperature considerations, and may again be set by the pilot or by the ECS controller 140, or by a combination of sensor data and pilot input.

Max flow demand is the maximum ECS input air mass flow that can be accommodated by the ECS. This may be a fixed, predetermined mass flow value, or may be determined in accordance with a schedule determined by, for example, ambient conditions such as ambient temperature and pressure.

ECS control mode is a signal set by the pilot or FMS 142, and communicated to the controller 140. The ECS control mode is either active or inactive, depending on whether ECS control mode is desirable.

If each of these three conditions is met, the process continues to step e); else, the process returns to step a).

In a fifth step e), a further condition is tested to determine how to proceed. In this step, the surge margin delta is compared to a handling bleed pressure delta. The handling bleed pressure delta is a reduction or increase in pressure that would be provided if one or more handling bleeds were to be modulated (i.e. switched from open to closed or vice versa).

If the surge margin delta is less than the handling bleed delta, then the controller modulates the ECS according to ECS flow demand in step $f_1$ by, for instance, opening or closing one or more of valves 108, 110, 112, 135 (or in the case of system 200, 235 by an amount determined to match the ECS input air mass flow to the ECS flow demand. Once this is completed, the method returns to step a).

If the surge margin delta is equal to or greater than the handling bleed delta, then the controller modulates one or more handling bleed valves (i.e. opens or closes one or more valves) to adjust the operating point of the compressor to match the operating point to the minimum surge margin in step $f_1$. Once the handling bleed valves are modulated, the method returns to step a). The method is repeated until the surge margin matches the minimum surge margin.

Accordingly, the invention provides a method of operating the air mass flow compressor to maintain the operating point close to the minimum surge line. Large changes that cannot be accommodated by the ECS input air mass flow changes will be accommodated by the handling bleeds and IGV angle changes in accordance with the normal schedule. The invention thereby minimizes use of the handling bleeds, and ensures that the compressor operates at its most efficient pressure ratio, which lies close to the minimum surge line.

Since the total amount of air circulated through the cabin may need to remain substantially unchanged, the recirculation valve 134 may be modulated to maintain cabin airflow within predetermined limits in spite of any changes in input air mass flow. For example, where input air mass flow is reduced, recirculation valve 134 is opened to allow more air to be recycled through the cabin, and where input air mass flow is increased, recirculation valve 134 is closed to allow less air to be recycled through the cabin. The valves 134 may be controlled by controller 140, or independently on the basis of flow measurements.

It will be understood that the present invention has been described in relation to its preferred embodiments and may be modified in many different ways without departing from the scope of the invention as defined by the accompanying claims.

Various changes could be made without departing from the scope of the invention. As noted above, although the described embodiments relate to a three-shaft engine, the invention is equally applicable to bleedless and bleed ECS configurations for two-shaft or single shaft engines. The invention is also applicable to turbojets having no bypass flow, or to turboprops or propfans, in which the fan is replaced with a propeller. The invention is also suitable to gas turbine engines used to drive a load such as a further compressor or an electrical generator. One example would be an auxiliary power unit (APU) for an aircraft, which typically comprises a single spool compressor with a further compressor driven by a further turbine for providing compressed air for the ECS and/or for main engines for starting.

The invention is also applicable to aircraft configurations in which multiple engines feed one ECS pack or a single engine feeds multiple ECS packs. For example, on a four engine aircraft four engines might feed two ECS packs (each comprising an air cycle machine fed by air from the ECS compressor or engine bleed air).

The invention claimed is:

1. A method of operating an environmental control system, the environmental control system comprising a dedicated environmental control system compressor powered configured to provide environmental control system input air;
the method comprising:
determining a current operating point of a gas turbine engine compressor; and reducing the environmental control system input mass flow when the current operating point of the compressor is determined to be less than a first predetermined margin of the compressor surge line, and increasing the environmental control system input mass flow when the current operating point of the compressor is determined to be greater than a second predetermined margin of the compressor surge line modulating mass flow of environmental control system input air to maintain
the operating point of the gas turbine engine compressor within predetermined limits.

2. A method according to claim 1, wherein the gas turbine engine comprises a high pressure compressor coupled to a high pressure turbine, a booster compressor coupled to a low pressure turbine, and a fan coupled to the low pressure turbine, the fan and booster compressor being coupled to the low pressure turbine by a low pressure shaft, and the high pressure compressor being coupled to the high pressure turbine by a high pressure shaft.

3. A method according to claim 1, wherein the gas turbine engine comprises a high pressure compressor coupled to a high pressure turbine by a high pressure shaft, an intermediate pressure compressor coupled to an intermediate pressure turbine by an intermediate pressure shaft, and a fan coupled to a low pressure turbine by a low pressure shaft.

4. A method according to claim 1, wherein the environmental control system compressor is powered by an electric motor, and wherein the electric motor is electrically powered by a gas turbine engine driven electrical generator.

5. A method according to claim 4, wherein the gas turbine engine comprises a high pressure compressor coupled to a high pressure turbine, a booster compressor coupled to a low pressure turbine, and a fan coupled to the low pressure turbine, the fan and booster compressor being coupled to the low pressure turbine by a low pressure shaft, and the high pressure compressor being coupled to the high pressure turbine by a high pressure shaft, and
the gas turbine engine generator that provides electrical power for the electric motor is driven by one of the low and intermediate pressure shafts.

6. A method according to claim 1, wherein the method comprises determining a combination of handling bleed valve positions and environmental control system input mass flows which maintains the operating point of the compressor at or above a minimum surge margin, or substantially matches the operating point of the compressor to the minimum surge margin.

7. A method according to claim 1, wherein the method comprises determining the operating point by comparing one or more sensed gas turbine engine parameters to a lookup table.

8. A method according to claim 7, wherein the sensed gas turbine engine parameters comprise one or more of pressure ratio, fuel flow, core air temperature compressor mass airflow and compressor rotational speed.

9. A method according to claim 1, wherein the method comprises comparing a pressure difference between the determined current operating point and a surge line to determine a current surge margin.

10. A method according to claim 9, wherein the method comprises using a lookup table comprising a relationship between environmental control system input air mass flow and current surge margin to determine an environmental control system input air mass flow required to match the operating point of the gas turbine engine compressor to the minimum surge margin.

11. A method according to claim 1, wherein the method comprises modulating a mass flow of environmental control system input air to maintain the operating point of the gas turbine engine compressor within predetermined limits only where the environmental control system input air mass flow is less than a maximum environmental control system inlet air mass flow capacity.

12. A method according to claim 1, wherein the method comprises modulating a mass flow of environmental control system input air to maintain the operating point of the gas turbine engine compressor within predetermined limits only where a difference between the environmental control system input air mass flow and an environmental control system inlet air flow set point is less than a predetermined value.

13. A method according to claim 1, wherein the method comprises modulating a mass flow of environmental control system input air to maintain the operating point of the gas turbine engine compressor within predetermined limits only where an environmental control system flow control mode is selected.

14. A method according to claim 1, wherein the method comprises modulating a mass flow of environmental control system input air to maintain the operating point of the gas turbine engine compressor within predetermined limits only where the difference between the surge margin with the modulated ECS air flow and the minimum surge margin is less than the difference between the surge margin that would be provided by opening a handling bleed and the minimum surge margin, and opening a handling bleed valve if the difference between the surge margin with the modulated ECS air flow and the minimum surge margin is greater than the difference between the surge margin that would be provided by opening a handling bleed and the minimum surge margin.

15. An environmental control system comprising:
   a handling bleed valve system;
   an environmental control system air input system; and
   a controller configured to modulate mass flow of environmental control system input air in accordance with the method of claim 1.

16. A method of operating an environmental control system comprising:
   determining a current surge margin of a gas turbine engine compressor; and
   modulating mass flow of environmental control system input air to maintain the surge margin of the gas turbine engine compressor within predetermined limits; and
   modulating a proportion of environmental control system input air and recirculation air in the environmental control system to thereby maintain to maintain cabin airflow within predetermined limits.

17. An environmental control system comprising:
   a handling bleed valve system;
   an environmental control system air input system; and
   a controller configured to modulate mass flow of environmental control system input air in accordance with the method of claim 16.

18. A method of operating an environmental control system comprising:
   determining a current surge margin of a gas turbine engine compressor; and
   modulating a mass flow of environmental control system input air to maintain the operating point of the gas turbine engine compressor within predetermined limits only where the difference between the surge margin with the modulated environmental control system mass flow and the minimum surge margin is less than the difference between the surge margin that would be provided by opening a handling bleed and the minimum surge margin, and opening a handling bleed valve if the difference between the surge margin with the modulated environmental control system air flow and the minimum surge margin is greater than the difference between the surge margin that would be provided by opening a handling bleed and the minimum surge margin.

19. An environmental control system comprising:
   a handling bleed valve system;
   an environmental control system air input system; and
   a controller configured to modulate mass flow of environmental control system input air in accordance with the method of claim 18.

* * * * *